Patented Sept. 11, 1945

2,384,568

UNITED STATES PATENT OFFICE 2,384,568

POLYMERIZATION PRODUCTS

Waldo L. Semon, Silver Lake, Ohio, assignor to The B. F. Goodrich Company, New York, N. Y., a corporation of New York No Drawing. Application March 5, 1940, Serial No. 322,381

10 Claims. (Cl. 260—78)

This invention relates to the copolymerization of conjugated aliphatic dienes with other unsaturated compounds and to the new class of rubber-like compositions obtainable thereby.

It has long been known that conjugated aliphatic dienes such as isoprene, butadiene, dimethyl butadiene and the like will undergo polymerization to form elastic vulcanizable masses resembling natural rubber in many of their properties. However, such polymers have never attained any widespread commercial success as natural rubber substitutes because of the difficulties attending their manufacture and the inferior quality of rubber goods produced therefrom.

More recently, processes have been developed whereby synthetic rubber-like materials of improved properties are obtained by the copolymerization of a conjugated diene, principally butadiene, with some other polymerizable substance. The compounds which have heretofore been used for conjoint polymerization with dienes contain in their molecules the polymerizable vinyl group CH$_2$=CH— and no other carbon to carbon double bonds. Typical examples of this class of compounds are acrylic acids or substituted acrylic acids and their esters and nitriles, monovinyl aromatic compounds such as styrene and vinyl naphthalene, and vinyl alkyl ketones. Rubber-like materials prepared by such copolymerization processes have decided advantages over simple diene polymers and in certain properties, such as resistance to swelling by solvents and to oxidation, they excel natural rubber. However, considerable difficulty is encountered in processing these copolymers due to their relatively tough and unyielding nature and their insufficient plasticity.

An object of the present invention, therefore, is to provide diene polymers or copolymers with increased plasticity and, as a result thereof, increased usefulness in the rubber industry. A further object is to produce an entirely new class of copolymers of useful properties. Further objects will appear in the following description of my invention.

The invention consists of the discovery that new types of diene polymers having improved properties, particularly in regard to plasticity, may be produced by polymerizing a diene hydrocarbon, or a mixture of diene hydrocarbons with polymerizable vinyl compounds, in the presence of an oxygen containing compound having in its structure at least two polymerizable olefinic double bonds which are not in a conjugated system. Each of the olefinic double bonds may be conjugated with an oxygen atom but the individual carbon to carbon double bonds must not be conjugated with respect to each other.

In this general class of compounds are included: esters of unsaturated alcohols with either saturated polybasic acids, unsaturated mono or polybasic acids or aromatic polybasic acids among which are diallyl or divinyl succinate, adipate, citrate, tartrate, phthalate, maleate, fumarate, itaconate and the like or allyl crotonate, acrylate and the like, or the corresponding vinyl esters; esters of unsaturated acids and polyhydric alcohols such as ethylene glycol diacrylate; ethers such as divinyl ether and diallyl ether; ketones such as diallyl ketone and other unsaturated compounds of the nature hereinabove set forth.

Any of the compounds of this class may be polymerized with a diene hydrocarbon such as butadiene, isoprene, dimethyl butadiene or, in general a compound of the formula

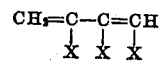

wherein each X may be hydrogen or methyl, or with a mixture of such a diene hydrocarbon and a polymerizable vinyl compound, such as acrylonitrile, styrene or the like, to yield rubbery substances of a variety of properties.

The proportions in which the ingredients to be polymerized are mixed may be varied within wide limits depending upon the properties desired in the polymerizate. In general, however, in order to obtain polymerizates of pronounced rubber-like characteristics it will be necessary to employ a larger amount of the diene hydrocarbon component than of the polymerizable unsaturated compound. In more particular, mixtures containing from 60 to 80 percent by weight of a diene, such as butadiene, and from 20 to 40 percent by weight of the unsaturated oxygen containing compound yield valuable soft plastic rubber-like masses. If particular properties of solvent or chemical resistance are desired in the polymerizate varying quantities of a vinyl compound such as acrylic nitrile may be introduced.

A number of processes may be used for polymerizing the mixed ingredients. For example, polymerization may be effected by the application of heat, actinic light, or pressure to the mixture either alone or in the presence of a solvent and either with or without the presence of a polymerization catalyst. However, it is preferred to carry out the polymerization in the form of an emulsion with a non-solvent liquid such as water, and in the presence of a suitable emulsifying agent and, if desired, a polymerization catalyst. The emulsifying agents ordinarily used in polymerization processes such as hymolal sulfates or sulfonates or aromatic sulfonates, for example, sodium isopropyl beta-naphthalene sulfonate, sodium butyl alpha-naphthalene sulfonate or tetrahydro-naphthalene beta-sulfonic acid; salts of high molecular weight organic bases, for example, the hydrochloride of diethylaminoethyloleylamide or cetyltrimethylammonium methyl sulfate; salts of fatty acids, for example, sodium oleate, sodium palmitate or sodium linoleate; or some other emulsifying agent may be used. In order to speed up the polymerization process it has been found desirable to add a polymerization catalyst such as benzoyl peroxide, diazoaminobenzene, dipotassium diazomethanedisulfonate, potassium persulfate, hydrogen peroxide, and the like, or hydrogen peroxide plus some substance which forms an addition compound with hydrogen peroxide such as sodium pyrophosphate, sodium oxalate, urea, glycine, alanine and the like. In some instances it may be desirable to add other ingredients which exert a favorable influence on the polymerization process, or which improve the properties of the copolymer.

Polymerization of the emulsion is preferably carried out at temperatures between 30° C. and 70° C. for periods from 40 to 100 hours and, preferably with continued shaking or stirring. The polymerization products are then obtained in the form of a milky emulsion resembling rubber latex to which age-resistors or antioxidants such a phenyl beta naphthylamine may be added, if desired, and which may be coagulated by the methods ordinarily used to coagulate rubber latices, for example, by freezing out, by addition of acid, alcohol, or salts or by a combination of these methods. After coagulation, the polymerization products are separated from the emulsion, washed and dried, whereby they are obtained as soft plastic and elastic rubber-like masses.

The rubber-like copolymerization products may be worked on standard rubber processing machinery and may be compounded with pigments, fillers, softeners, resins, antioxidants and vulcanizing ingredients such as sulphur and accelerators in much the same manner as natural rubber. These products may also be vulcanized or cured and, depending upon the compounding and vulcanizing conditions, a variety of vulcanizates may be obtained. Molded products may also be produced from these polymers since they may be shaped and extruded while in the plastic condition.

As has been hereinabove mentioned the particular properties of the copolymer will depend largely upon the proportions of ingredients used and upon the polymerization conditions. For this reason the products are useful in many applications. They are not only useful as rubber substitutes but also find application as molding ingredients, in adhesive compositions, coating compositions and the like.

In order further to illustrate and clarify my invention the following examples are cited although it is to be understood that the invention is not limited in any way by the details therein set forth.

Example 1

A mixture consisting of 75 parts by weight of butadiene and 25 parts by weight of allyl crotonate are emulsified with 250 parts of a 2% aqueous solution of the hydrochloride of diethylaminoethyloleylamide, 2 parts by weight of benzoyl peroxide being present as a catalyst. The emulsion is then allowed to polymerize by continuously agitating the same for two and one-half days at a constant temperature of 60° C. Thus is obtained a latex like mass which after addition of 2 parts of phenyl beta naphthylamine is coagulated with alcohol. After washing and drying, the soft plastic coagulum may be milled with great ease on an ordinary two roll mixing mill and easily takes up compounding ingredients. When compounded and vulcanized in a normal manner, this copolymer yields vulcanizates of good elasticity and satisfactory strength.

If in the foregoing example a 50–50 mixture of butadiene and allyl crotonate is used, a sticky, waxy material useful in a number of compositions is obtained.

Allyl crotonate,

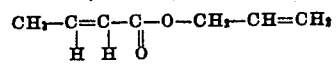

used in this example is characteristic of the class of compounds consisting of esters of unsaturated alcohols with unsaturated acids.

Example 2

Seventy-five parts by weight of butadiene and 25 parts by weight of diallyl adipate are emulsified with 150 parts of a 5% aqueous solution of sodium isopropyl beta-naphthalene sulfonate and 2 parts of benzoyl peroxide. The emulsion thus formed is polymerized at 60° C. for two days with continuous agitation and the resulting latex-like emulsion is coagulated with acetic acid and salt. The polymerizate obtained is a soft, tacky rubber-like solid. It is milled without difficulty and may be compounded and vulcanized in the same manner as natural rubber.

When 75% diallyl adipate and 25% butadiene are polymerized as in the above example a white, tough, solid substance is obtained which may be used as a molding composition.

Diallyl adipate is characteristic of the class of compounds consisting of esters of unsaturated alcohols with polybasic acids. Other allyl esters of polybasic acids which have been polymerized with butadiene to yield rubber-like substances include di-allyl phthalate, di-allyl citrate, di-allyl maleate, tri-allyl phosphate, di-allyl succinate and di-allyl itaconate.

Although I have specifically described only preferred embodiments of my invention, it will be apparent to those skilled in the art that widely different materials, proportions and polymerizing conditions may be employed without departing from the spirit and scope of my invention as defined by the appended claims.

I claim:

1. A process which comprises copolymerizing a mixture including a substantial proportion of a conjugated diene of the general formula

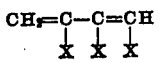

wherein each X represents a member of the class consisting of hydrogen and methyl, and a substantial proportion of an ester containing at least two polymerizable

groups separated by the ester linkage.

2. A process which comprises copolymerizing in aqueous emulsion a mixture including a substantial proportion of butadiene and a substantial proportion of an ester containing at least two polymerizable

groups separated by the ester linkage.

3. A process which comprises copolymerizing a mixture consisting of butadiene and diallyl adipate said mixture containing at least 50% by weight of butadiene.

4. A process which comprises copolymerizing a mixture consisting of butadiene and diallyl phthalate said mixture containing at least 50% by weight of butadiene.

5. A process which comprises copolymerizing a mixture consisting of butadiene and a polyallyl ester of a polybasic acid said mixture containing at least 50% by weight of butadiene.

6. A product prepared by the polymerization of a mixture including a substantial proportion of a conjugated diene of the general formula

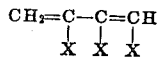

wherein each X represents a member of the class consisting of hydrogen and methyl, and a substantial proportion of an ester containing at least two polymerizable

groups separated by the ester linkage.

7. A product prepared by the polymerization of a mixture including a substantial proportion of butadiene and a substantial proportion of an ester containing at least two polymerizable

groups separated by the ester linkage.

8. A product prepared by the polymerization of a mixture consisting of butadiene and a polyallyl ester of a polybasic acid, said mixture containing at least 50% by weight of butadiene.

9. A product prepared by the polymerization of a mixture consisting of butadiene and diallyl adipate said mixture containing at least 50% by weight of butadiene.

10. A product prepared by the polymerization of a mixture consisting of butadiene and diallyl phthalate said mixture containing at least 50% by weight of butadiene.

WALDO L. SEMON.